United States Patent [19]

Ahmed

[11] Patent Number: 5,523,367
[45] Date of Patent: * Jun. 4, 1996

[54] SUPERABSORBENT POLYMERS FROM AMPHOLYTIC MONOMERS

[75] Inventor: Iqbal Ahmed, Bartlesville, Okla.

[73] Assignee: Phillips Petroleum Company, Bartlesville, Okla.

[*] Notice: The portion of the term of this patent subsequent to Jan. 27, 2014, has been disclaimed.

[21] Appl. No.: 376,577

[22] Filed: Jan. 23, 1995

Related U.S. Application Data

[60] Continuation-in-part of Ser. No. 186,958, Jan. 27, 1994, Pat. No. 5,484,865, which is a division of Ser. No. 886,215, May 20, 1992, Pat. No. 5,250,642, and Ser. No. 78,342, Jun. 21, 1993, Pat. No. 5,294,691.

[51] Int. Cl.$^6$ ............................ C08F 226/06; C08F 228/02
[52] U.S. Cl. ................. 526/240; 526/240; 526/259; 526/263; 526/264; 526/277; 526/307
[58] Field of Search ...................... 526/240, 287, 526/259, 263, 264, 277, 307

[56] References Cited

U.S. PATENT DOCUMENTS

| | | | |
|---|---|---|---|
| 4,454,114 | 6/1984 | Strasilla et al. | 424/70 |
| 4,460,570 | 7/1984 | Strasilla et al. | 424/70 |
| 5,075,399 | 12/1991 | Ahmed et al. | 526/287 |
| 5,098,970 | 3/1992 | Hsieh et al. | 526/287 |
| 5,106,929 | 4/1992 | Ahmed et al. | 526/240 |
| 5,130,389 | 7/1992 | Ahmed | 526/240 |
| 5,250,642 | 10/1993 | Ahmed | 526/240 |
| 5,281,673 | 1/1994 | Ahmed et al. | 525/281 |
| 5,294,691 | 3/1994 | Ahmed et al. | 526/287 |
| 5,391,669 | 2/1995 | Sulc | 526/265 |

OTHER PUBLICATIONS

Encyclopedia of Polymer Science and Engineering, vol. 11, pp. 514–530 (1988).

Primary Examiner—Christopher Henderson
Attorney, Agent, or Firm—Lucas K. Shay

[57] ABSTRACT

A composition which comprises a water-polymer and a process for using the polymer to absorb a fluid are disclosed. The water-insoluble polymer comprises repeate units derived from: (a) an ampholytic monomer which is a polymerizable vinylic amine-containing monomer and an acid having an ethylenic moiety; (b) at least one olefinic comonomer; and optionally, (c) one crosslinking agent which has at least two polymerizable olefinic functionalities wherein the olefinic functionalities are suitable for crosslinking.

7 Claims, No Drawings

SUPERABSORBENT POLYMERS FROM AMPHOLYTIC MONOMERS

This application is a continuation-in-part of application Ser. No. 08/186,958, filed Jan. 27, 1994 now U.S. Pat. No. 5,484,865; which is a division of applications Ser. No. 07/886,215 filed May 20, 1992, now U.S. Pat. No. 5,250,642 and Ser. No. 08/078,342 filed Jun. 21, 1993, now U.S. Pat. No. 5,294,691.

FIELD OF THE INVENTION

The present invention relates to water-insoluble compositions capable of absorbing fluids such as water or aqueous solutions.

BACKGROUND OF THE INVENTION

Polymers for absorbing water or aqueous solutions are used in numerous commercial and industrial applications. For example, polymers are used to improve water absorbency of paper towels and disposable diapers.

Though known water absorbing polymers are highly absorbent to deionized water, they are dramatically less absorbent to aqueous solutions such as salt water, brine, and urine. For example, hydrolyzed crosslinked polyacrylamide absorbs 1,024 grams of deionized water per gram of polymer, but only 25 grams of synthetic urine per gram of polymer. Crosslinked polyacrylate absorbs 423 grams of deionized water per gram of polymer, but only 10 grams of synthetic urine per gram of polymer. Hydrolyzed crosslinked polyacrylonitrile absorbs 352 grams of deionized water per gram of polymer, but only 25 grams of synthetic urine per gram of polymer. Analogous starch-grafted copolymers generally have very poor absorbency to synthetic urine.

It would be a valuable contribution to the art to develop polymers with high absorbency to not only water but also aqueous solutions. The market for these types of copolymers is large and the uses are numerous. Therefore, seemingly small improvements in the absorbency translate into large savings in the quantity of polymer required to absorb these liquids and large savings to consumers.

SUMMARY OF THE INVENTION

Thus, it is an object of the present invention to provide polymers which are highly absorbent to water or aqueous solutions, or both. It is also an object of the present invention to provide a process for preparing polymers having high absorbency to water or aqueous solutions. A further object of the present invention is to provide a method of using the polymers of the present invention for absorbing water or an aqueous solution.

Further objects, features, and advantages of the present invention will be readily apparent to those skilled in the art upon reading the description of the invention which follows.

According to a first embodiment of the present invention, a water-insoluble polymer having a high absorbency to water or aqueous solutions, or both, is provided which comprises repeat units derived from: (a) a vinylic tertiary amine or an ampholytic monomer selected from the group consisting of ampholytic inner salts, ampholytic ion pairs, and combinations of two or more thereof wherein the ampholytic ion pair comprises a cation moiety and an anion moiety wherein the cation moiety is derived from a polymerizable vinylic nitrogen-containing monomer and the anion is a vinylic acid having an acid moiety selected from the group consisting of phosphonic acids, phosphinic acids, sulfuric acids, sulfurous acids, sulfinic acids, sulfonic acids, carboxylic acids, phosphoric acids, alkali metal salts of the acids, and combinations thereof; (b) at least one olefinic comonomer; and optionally, (c) at least one crosslinking agent which has at least two polymerizable olefinic functionalities wherein the olefinic functionalities are suitable for crosslinking.

According to a second embodiment of the present invention, a water-insoluble graft copolymer is provided which is prepared by contacting a main polymer chain, under conditions effective to prepare a graft copolymer, with a composition or repeat units thereof wherein the composition comprises repeat units derived from: (a) a vinylic tertiary amine or an ampholytic monomer selected from the group consisting of ampholytic inner salts, ampholytic ion pairs, and combinations of two or more thereof wherein the ampholytic ion pair comprises a cation moiety and an anion moiety wherein the cation moiety is a polymerizable vinylic nitrogen-containing monomer and the anion moiety is a vinylic acid having an acid moiety selected from the group consisting of phosphonic acids, phosphinic acids, sulfuric acids, sulfurous acids, sulfinic acids, sulfonic acids, carboxylic acids, phosphoric acids, metal salts of the acids, and combinations thereof; (b) at least one olefinic comonomer; and optionally, (c) at least one crosslinking agent which has at least two polymerizable olefinic functionalities wherein the olefinic functionalities are suitable for crosslinking.

According to a third embodiment of the present invention, a process for absorbing a fluid such as water or an aqueous solution comprises contacting a water-insoluble composition with the fluid wherein the water-insoluble composition is selected from the group consisting of water-insoluble polymers, water-insoluble graft copolymers, and combinations of two or more thereof wherein the water-insoluble polymer comprises repeat units derived from: (a) a vinylic tertiary amine or an ampholytic monomer selected from ampholytic inner salts, ampholytic ion pairs, and combinations of two or more thereof wherein the ampholytic ion pair comprises a cation moiety and an anion moiety wherein the cation moiety is a polymerizable vinylic nitrogen-containing monomer and the anion moiety is a vinylic acid having an acid moiety selected from the group consisting of phosphonic acids, phosphinic acids, sulfuric acids, sulfurous acids, sulfinic acids, sulfonic acids, carboxylic acids, phosphoric acids, metal salts of the acids, and combinations thereof; (b) at least one olefinic comonomer; and optionally, (c) at least one crosslinking agent which has at least two polymerizable olefinic functionalities wherein the olefinic functionalities are suitable for crosslinking; and the water-insoluble graft copolymer is prepared by contacting a main polymer chain, under conditions effective to prepare a graft copolymer, with a composition or repeat units thereof wherein the composition comprises repeat units derived from: (a) an ampholytic monomer selected from the group consisting of ampholytic inner salts, ampholytic ion pairs, and combinations of two or more thereof wherein the ampholytic ion pair comprises a cation moiety and an anion moiety wherein the cation moiety is a polymerizable vinylic nitrogen-containing monomer and the anion moiety is a vinylic acid having an acid moiety selected from the group consisting of phosphonic acids, phosphinic acids, sulfuric acids, sulfurous acids, sulfinic acids, sulfonic acids, carboxylic acids, phosphoric acids, metal salts of the acids, and combinations thereof; (b) at least one olefinic comonomer; and optionally, (c) at least one crosslinking agent which has at least two polymerizable olefinic functionalities wherein the olefinic functionalities are suitable for crosslinking.

DETAILED DESCRIPTION OF THE INVENTION

The present invention provides water-insoluble compositions that are highly absorbent to a fluid such as water or aqueous solutions. Typical aqueous solutions include, but are not limited to, tap water, a solution, a suspension, or combinations of two or more thereof wherein the solution or suspension contains dissolved, partially dissolved, or undissolved substances. The substances can be any salts or any materials known to one skilled in the art, or combinations of any two or more salts.

Examples of salts that can be present in the aqueous solutions of the invention include, but are not limited to, sodium chloride, potassium chloride, calcium chloride, magnesium chloride, magnesium sulfate, other metal sulfates, metal phosphates, metal carbonates, metal bicarbonates, organic salts, other organic substances, and combinations of two or more thereof. Generally the total salts content in the composition can vary widely from as low as 0.000001 to as high as 80 weight %. Examples of such aqueous solution include, but are not limited to, urine, blood, waste water, and combinations of two or more thereof.

The term "monomer" is used herein to generically, unless otherwise indicated, mean monomers, comonomers, termonomers, tetramonomers, etc. The term "comonomer" is used generically, unless otherwise indicated, to mean monomers, comonomers, termonomers, tetramonomers, etc. for polymers wherein there are at least two different monomers.

The term "polymer" used herein to describe the invention generically refers to a polymer having two or more different monomers, i.e. copolymers, terpolymers, tetrapolymers, etc., and includes those prepared by copolymerization of an effective amount of each of the following monomers to produce a composition having the above-described properties.

Unless otherwise indicated, the term "alkali metal salts" is generically used in this application to mean salts containing ammonium cation and alkali metal cations such as lithium, sodium, potassium, and combinations of two or more thereof.

Examples of suitable vinylic tertiary amine include, but are not limited to, amines having the formula of $R^1=C(R^1)-C(O)-N(R^1)(R^2)$ wherein $R^1$ and $R^2$ are each selected from the group consisting of hydrogen, alkyl radicals, aryl radicals, aralkyl radicals, and alkaryl radicals wherein each radical can contain 1 to about 12 carbon atoms, 2-vinylpyridine, 4-vinylpyridine, N-vinylimidazole, 2-vinylquinoline, and combinations of two or more thereof. The presently preferred $R^1$ is hydrogen. These vinylic tertiary amines are generally commercially available.

According to the first embodiment of the present invention, the ampholytic monomer can be an ampholytic inner salt, or an ampholytic ion pair comprising a cation moiety and an anion moiety, or combinations of two or more thereof.

The ampholytic monomer can be an ampholytic inner salt having the formula of

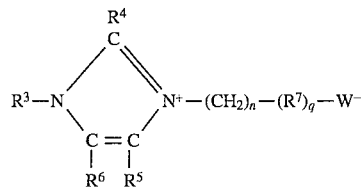

wherein one and only one of $R^3$, $R^4$, $R^5$, and $R^6$ must be a vinyl group, the rest can be the same or different and can be hydrogen, alkyl radical, aryl radical, aralkyl radical, or alkaryl radical; $R^7$ is a phenyl group; n is $\geq 1$ and $\leq 6$; q is 0 or 1; and W is an acid moiety selected from the group consisting of phosphonic acids, phosphinic acids, sulfuric acids, sulfurous acids, sulfinic acids, sulfonic acids, carboxylic acids, phosphoric acids, alkali metal salts of the acids, and combinations of two or more thereof. The presently preferred $R^3$, $R^4$, $R^5$, and $R^6$, if not a vinyl group, are each hydrogen or a $C_1$–$C_3$ alkyl radical, or combinations of two or more thereof.

The cation moiety generally is a vinylic amine-containing monomer which has the formula of $R^1-C(R^1)=C(R^2)-C(O)-G-Y-Z$ wherein $R^1$ and $R^2$ are each selected from the group consisting of hydrogen, alkyl radicals, aryl radicals, aralkyl radicals, and alkaryl radicals wherein each radical can contain 1 to about 12 carbon atoms; G is O or NH; Y is an alkylene radical which has 1 to about 10, preferably 1 to about 7, and most preferably 1 to 4 carbon atoms and can contain substituents selected from the group consisting of hydroxy group, halides, amino groups, alkyl radicals, aryl radicals, aralkyl radicals, and alkaryl radicals wherein each carbon containing radical has 1 to about 12 carbon atoms; Z has a formula selected from the group consisting of $N(R^1)_2$, $N^+(R^1)_3X^-$, and combinations thereof; $R^1$ is the same as disclosed above; and X can be any inorganic anion such as, for example, sulfonates, sulfinates, phosphonates, phosphinates, halides, sulfate, phosphate, nitrate, and combinations thereof. The presently preferred $R^1$ is hydrogen and X is a halide or combinations of halides. The presently most preferred X is chloride anion.

Examples of the presently preferred ampholytic inner salts include, but are not limited to, 1-vinyl-3-(3-sulfopropyl)-imidazolium hydroxide inner salt, 1-vinyl-3-(4-sulfobutyl)imidazolium hydroxide inner salt, 1-vinyl-2-methyl-3-(3-sulfopropyl)imidazolium hydroxide inner salt, 1-vinyl-2-methyl-3-(4-sulfobutyl)imidazolium hydroxide inner salt, 1-vinyl-3-(2-sulfobenzyl)imidazolium hydroxide inner salt, 2-vinyl-3-(3-sulfopropyl)imidazolium hydroxide inner salt, 2-vinyl-3-(4-sulfobutyl)imidazolium hydroxide inner salt, 4(5)-vinyl-1-(3-sulfopropylsulfobutyl)imidazolium hydroxide inner salt, 4(5)-vinyl-1-(4sulfobutyl)imidazolium hydroxide inner salt, 1-methyl-2-vinyl-3-(3-sulfopropyl)imidazolium hydroxide inner salt, 1-vinyl-3-(4-sulfobutyl) imidazolium hydroxide inner salt, 2-vinyl-1-(3-sulfopropyl)imidazolium hydroxide inner salt, 2-methyl-5-vinyl-1-(3-sulfopropyl)pyridinium hydroxide inner salt, 4-vinyl-1-(3-sulfopropyl)pyridinium hydroxide inner salt, dimethyl-(2-methacryloxyethyl)(3-sulfopropyl)pyridinium hydroxide inner salt, dimethyl-(2-methacryloxyethyl)(3-sulfopropyl)ammonium hydroxide inner salt, diethyl-(2-methacryloyloxyethoxy-2-ethyl)(3-sulfopropyl)ammonium hydroxide inner salt, 4-vinyl-4-(sulfobutyl)pyridinium hydroxide inner salt, 2-vinyl-2-(4-sulfobutyl)pyridinium hydroxide inner salt, N-(3-sulfopropyl)-N-methacrylamidopropyl-N,N-dimethylammonium betaine, N-(3-carboxypropyl)-N-methacrylamidopropyl-N,N-dimethylammonium betaine, 4-vinylpiperidinium ethanecarboxy betaine, 4-vinylpiperidinium methanecarboxy betaine, and combinations of two or more thereof.

Examples of the presently preferred vinylic polymerizable nitrogen-containing monomer include, but are not limited to, 2-methacryloyloxyethyltrimethylammonium halides, 2-acryloyloxyethyltrimethylammonium halides, 2-methacryloyloxyethyldiethylamine, 2-acryloyloxyethyldiethylamine, 3-methacrylamidopropyltrimethylammonium halides, 3-acrylamidopropyltrimethylammonium halides, 3-methacrylamidopropyldimethylamine, 3-acrylamidopropyldimethylamine, 2-methacryloyloxyethyldimethylamine, 2-acryloyloxyethyldimethylamine, 2-acrylamido-2-methylpropanedimethylamine, 2-methacrylamido-2-methylpropanedimethylamine, 2-methacrylamido-2-methylbutanedimethylamine, N-vinylimidazole, 1-methyl-2-vinylimidazole, 2-vinylimidazole, 4(5)-vinylimidazole, 2-vinylpyridine, 4-vinylpyridine, 2-dimethylaminoethyl methacrylate, 2-diethylaminoethyl methacrylate, 3-methacrylamidopropyldimethylammonium halides, 3-methacrylamidobutyldimethylammonium halides, diallyldimethylamine, diallyldimethylammonium, 2-vinylquinoline, and combinations of two or more thereof. The presently most preferred polymerizable vinylic tertiary amine-containing monomers are N-vinylimidazole, 2-vinylpyridine, 4-vinylpyridine, 2-dimethylaminoethyl methacrylate, 2-diethylaminoethyl methacrylate, 3-methacrylamidopropyldimethylammonium, 3-methacrylamidopropyldimethylamme, and combinations of two or more thereof.

The acid moiety of the ampholytic ion pair must have a polymerizable ethylenic linkage. Examples include vinylic phosphonic acids, vinylic phosphinic acids, vinylic carboxylic acids, vinylic phosphoric acids, alkali metal salts thereof and combinations of two or more thereof. The presently preferred vinylic carboxylic acids and alkali metal salts thereof include, but are not limited to, acrylic acid, methacrylic acid, maleic acid, itaconic acid, N-vinylglycine, vinylacetic acid, 4-vinylbenozic acid, crotonic acid, styrene acetic acid, dimethylvinyl acetic acid, 5-heptenic acid (4-vinylvaleric acid), 2-hexenioc acid, 3-hexenoic acid, 3-vinyl-4-piperidine acetic acid, 4-vinyl-1-cyclohexene-1,4-dicarboxylic acid, 10-undecenoic acid, cinnamic acid and 2-acetamidoacrylic acid, and combinations of two or more thereof. The presently most preferred vinylic carboxylic acids and alkali salts thereof are acrylic acid and methacrylic acid, and mixtures thereof.

Examples of the presently preferred vinylic phosphoric acids and alkali metal salts thereof are vinyl phosphoric acid and allyl phosphoric acid.

Examples of suitable vinylic phosphonic acids include, but are not limited to, acryloylphosphonic acid, methacryloylphosphonic acid, alkali metal salts of acryloylphosphonic acid, alkali metals salts of methacryloylphosphonic acid, 2-methacryloyloxyethyltrimethylphosphonic acid, 2-acrylamido-2-methylpropane phosphonic acid, alkali metal salts of 2-acrylamido-2-methylpropane phosphonic acid, 2-methacryloyloxyethane phosphonic acid, alkali metal salts of 2-methacryloyloxyethane phosphonic acid, 2-methacryloyloxyethyldiethylphosphonic acid, 3-methacrylamidopropyldimethylphosphonic acid, styrene phosphonic acid, alkali metal salts of styrene phosphonic acid, and combinations of two or more thereof.

Examples of suitable vinylic phosphinic acids include, but are not limited to, acryloylphosphinic acid, methacryloylphosphinic acid, alkali metal salts of acryloylphosphinic acid, alkali metals salts of methacryloylphosphinic acid, 2-methacryloyloxyethyltrimethylphosphinic acid, 2-acrylamido-2-methylpropane phosphinic acid, alkali metal salts of 2-acrylamido-2-methylpropane phosphinic acid, 2-methacryloyloxyethane phosphinic acid, alkali metal salts of 2-methacryloyloxyethane phosphinic acid, 2-methacryloyloxyethyldiethylphosphinic acid, 3-methacrylamidopropyldimethylphosphinic acid, styrene phosphinic acid, alkali metal salts of styrene phosphinic acid, and combinations of two or more thereof.

Examples of suitable vinylic sulfuric acids include, but are not limited to, acryloylsulfuric acid, methacryloylsulfuric acid, alkali metal salts of acryloylsulfuric acid, alkali metals salts of methacryloylsulfuric acid, 2-methacryloyloxyethyltrimethylsulfuric acid, 2-acrylamido-2-methylpropane sulfuric acid, alkali metal salts of 2-acrylamido-2-methylpropane sulfuric acid, 2-methacryloyloxyethane sulfuric acid, alkali metal salts of 2-methacryloyloxyethane sulfuric acid, 2-methacryloyloxyethyldiethylsulfuric acid, 3-methacrylamidopropyldimethylsulfuric acid, styrene sulfuric acid, alkali metal salts of styrene sulfuric acid, and combinations of two or more thereof.

Examples of suitable vinylic sulfinic acids include, but are not limited to, acryloylsulfinic acid, methacryloylsulfinic acid, alkali metal salts of acryloylsulfinic acid, alkali metals salts of methacryloylsulfinic acid, 2-methacryloyloxyethyltrimethylsulfinic acid, 2-acrylamido-2-methylpropane sulfinic acid, alkali metal salts of 2-acrylamido-2-methylpropane sulfinic acid, 2-methacryloyloxyethane sulfinic acid, alkali metal salts of 2-methacryloyloxyethane sulfinic acid, 2-methacryloyloxyethyldiethylsulfinic acid, 3-methacrylamidopropyldimethylsulfinic acid, styrene sulfinic acid, alkali metal salts of styrene sulfinic acid, and combinations of two or more thereof.

Examples of suitable vinylic sulfurous acids include, but are not limited to, acryloylsulfurous acid, methacryloylsulfurous acid, alkali metal salts of acryloylsulfurous acid, alkali metals salts of methacryloylsulfurous acid, 2-methacryloyloxyethyltrimethylsulfurous acid, 2-acrylamido-2-methylpropane sulfurous acid, alkali metal salts of 2-acrylamido-2-methylpropane sulfurous acid, 2-methacryloyloxyethane sulfurous acid, alkali metal salts of 2-methacryloyloxyethane sulfurous acid, 2-methacryloyloxyethyldiethylsulfurous acid, 3-methacrylamidopropyldimethylsulfurous acid, styrene sulfurous acid, alkali metal salts of styrene sulfurous acid, and combinations of two or more thereof.

The ampholytic inner salts either are commercially available or can be prepared by the ring-opening reaction of a nucleophilic amine group with a sultone ring. For example, a nucleophilic amine-containing ring such as, for example, 1-vinylimidazole, can be added to a sultone ring compound such as, for example, 1,3-propane sultone, in a solvent such as, for example, ethylacetate. The molar ratio of the nucleophilic amine to the sultone can be in the range of from about 0.1:1 to about 10:1. The molar ratio of the amine to solvent can be in the range of from about 0.0001:1 to about 0.1:1. Thereafter, the reactants are allowed to react for as long as 20 days. A precipitate is generally formed which can be recovered by any means known to one skilled in the art such as, for example, filtration, decantation, centrifugation, or combinations thereof. The product recovered can be further purified by any methods known to one skilled in the art such as, for example, washing, recrystalization, or combinations thereof.

The ampholytic ion pairs can be prepared by the following procedures. The ampholytic ion-pair monomer can be prepared by titrating an aqueous solution of an acid monomer to pH about 6 to about 7, preferably about 7, with a polymerizable nitrogen-containing monomer at a temperature of about 0°–15° C. Generally, if a quaternary salt or an acid salt is used as an amine-containing monomer, nonpolymerizable small molecules are first removed by dialysis. The resulting aqueous solution containing the ampholytic ion pair monomer may be purified by contacting the aqueous solution one or more times with small quantities of activated charcoal. The concentration of the ampholytic ion pair in the aqueous solution may be determined by evaporatively drying a known amount of the aqueous solution and weighing the residue.

Alternatively, the ampholytic ion pair monomer may be prepared by reacting the acid monomer with the nitrogen-containing monomer (molar ratio about 0.5:1 to about 2:1) in an anhydrous organic solvent, such as tetrahydrofuran and ethyl acetate. In this case the ampholytic ion pair monomer is obtained as precipitate. The solid monomer may be purified by recrystallization from chloroform or other organic solvent. Because the solid ampholytic ion pair monomers are extremely hygroscopic and tend to polymerize spontaneously, they should be handled carefully.

Any olefinic comonomers having at least one functionality selected from the group consisting of amine, amide, nitrile, carboxylic acid, sulfonic acid, phosphonic acid, sulfinic acid, phosphinic acid, and combinations of two or more thereof can be used in the present invention. Examples of olefinic comonomers include, but are not limited to, acryloylpiperizine, methacryloylpiperizine, methacryloylmorpholine, acrylamide, methacrylamide, acrylonitrile, acrylic acid, methacrylic acid, alkali metal salts of acrylic acid, alkali metal salts of methacrylic acid, 2-methacryloyloxyethyltrimethylamine, 2-acrylamido-2-methylpropane sulfonic acid, alkali metal salts of 2-acrylamido-2-methylpropane sulfonic acid, 2-methacryloyloxyethane sulfonic acid, alkali metal salts of 2-methacryloyloxyethane sulfonic acid, acryloylmorpholine, N-4-butylphenylacrylamide, 2-acrylamido-2-methylpropane dimethylammonium chloride, 2-methacryloyloxyethyldiethylamine, 3-methacrylamidopropyldimethylamine, styrene sulfonic acid, alkali metal salts of styrene sulfonic acid, N-vinyl-2-pyrrolidone, other olefinic comonomers having the formula of

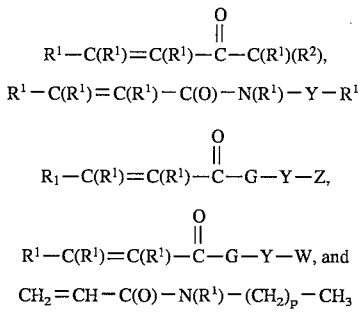

wherein $R^1$, $R^2$, G, Y, W, and Z are the same as disclosed above; p is a number of 1 to about 10, combinations of two or more thereof. These comonomers are believed to be commercially available.

Suitable crosslinking agents are those having at least two olefinic functionalities which are suitable for polymerization and include, but are not limited to, N,N-diallylmethacrylamide, diallylamine, N,N-bisacrylamidoacetic acid, N,N'-bisacrylamidoacetic acid methylester, N,N'-methylenebisacrylamide (methylene-bis-acrylamide), N,N-benzylidenebisacrylamide, allylacrylate, diisopropenylbenzene, diallyl succinate, ethylene glycol diacrylate, diallylacrylamide, divinylbenzene, dinvinyldioxymethylene acetic acid, alkali salts of divinyldioxymethylene acetic acid, and combinations of two or more thereof. All these suitable crosslinking agents are commercially available. The presently preferred crosslinking agent is N,N'-methylenebisacrylamide.

The polymers of the present invention are generally prepared by mixing the ampholytic monomers and comonomers in desired molar ratios in aqueous solution and then initiating the free-radical copolymerization. The copolymerization of a ampholytic ion pair with an olefinic comonomer and a crosslinking agent can be achieved by any of the well known free-radical polymerization techniques in solution, suspension, or emulsion environment. Well known azo compounds commonly employed to initiate free radical polymerization reactions include 2,2'-azobis(N,N'-dimethylisobutyramidine) dihydrochloride, azobisisobutyronitrile, 4,4'-azobis(4-cyanovaleric acid), 2,2'-azobis(2,4-dimethyl(4-methoxyvaleronitrile), 2,2'-azobis(2,4-dimethylvaleronitrile), 2,2'-azobis(2-amidinopropane)-dihydrochloride, 2-t-butylazo-2-cyano-4-methoxy-4-methylpentane, and 2-t-butylazo-2-cyano-4-methylpentane, and 4-t-butylazo-4-cyanovaleric acid. Well known inorganic peroxide compounds commonly employed to initiate free radical polymerization reactions include hydrogen peroxide, alkali metal persulfates, alkali metal perborates, alkali metal perphosphates, and alkali metal percarbonates. Well known organic peroxide compounds commonly employed to initiate free radical polymerization reactions include lauryl peroxide, 2,5-dimethyl-2,5-bis(2-ethylhexanoylperoxy)hexane, t-butylperoxyprivilate, t-butylperoctoate, p-methane hydroperoxide, and benzoylperoxide. The compound t-butylhyponitrite is a well known alkyl hyponitrite commonly employed to initiate free radical polymerization reactions. Furthermore, ultraviolet light is commonly employed to initiate free radical polymerization reactions. In addition, such other methods of copolymerization as would have occurred to one skilled in the art may be employed, and the present invention is not limited to the particular method of preparing the polymer set out herein.

The inventive polymers of the present invention containing an olefinic comonomer which has a functionality selected from the group consisting of sulfinate, phosphate, phosphinate, sulfate, amide, nitrile, carboxylate, phosponate, sulfonate, acid forms thereof, and combinations of two or more thereof as well as crosslinking agent having a functionality selected from the group consisting of phosphonate, phosphate, phosphinate, sulfate, sulfinate, amide, nitrile, carboxylate, sulfonate, acid forms thereof, and combinations of two or more thereof can optionally be at least partially hydrolyzed and/or neutralized by heating with aqueous base such as aqueous sodium hydroxide or aqueous potassium hydroxide. The degree of hydrolysis and/or neutralization can be controlled by stoichiometrically limiting the amount of base relative to the amount of sulfinic acid, phosphonic acid, phosphinic acid, amide, nitrile, carboxylic acid, and sulfonic acid functionalities. If the hydrolysis is carried out under acidic conditions, the amide and nitrile functionalities can be converted to carboxylic acid functionalities. The term "partially hydrolyzed" used in the application, unless otherwise indicated, refers to incomplete hydrolysis of the functionalities disclosed immediately hereinabove. Generally, a partially hydrolyzed polymer has about 1 to about 99% of the functionalities being hydrolyzed.

A typical process for hydrolysis can be carried out by suspending a one gram sample of a polymer in about 1 to about 1000 ml of a base such as, for example, sodium hydroxide or potassium hydroxide, or an acid such as for example hydrochloric acid or sulfuric acid to form a suspension. The suspension is then heated at about 50° to about 150° C. for about 5 minutes to about 10 hours to form a treated suspension which is then washed with water followed by adjusting the pH of the suspension to about 6.5 to 7.5. The hydrolyzed polymer is then dried.

The polymers of the present invention can also optionally be saponified. The term "saponified" used herein, unless otherwise indicated, is the same as at least partially hydrolyzed and/or neutralized of the nitrile, amide, or other functionalities by heating the polymer with an aqueous base. The presently preferred base is selected from the group consisting of lithium hydroxide, sodium hydroxide, potassium hydroxide, ammonium hydroxide, calcium hydroxide, and mixtures thereof. The presently most preferred base is sodium hydroxide. Hydrolysis of these functionalities can be carried out under acidic or basic conditions. Under basic conditions, it generally also includes neutralization of carboxylic acid and sulfonic acid functionalities. The degree of hydrolysis and/or neutralization can be controlled by stoichiometrically limiting the amount of base relative to the amount of amide, nitrile, carboxylic acid, sulfonic acid, and other acid functionalities.

The mole percent of the ampholytic monomer of the present invention ranges from about 1 to about 60, preferably from about 2 to about 50, and most preferably 3 to 30 per molecule of the polymer. The mole percent of the comonomers(s) ranges from about 40 to about 99, preferably from about 50 to about 98, and most preferably from 70 to 97 per molecule of the polymer. The total mole percent of the ampholytic monomer and the comonomer equals 100 mole percent. The crosslinking agent is provided in an amount effective to produce a highly absorbent copolymer. The mole percent of the crosslinking agent can be from about 0.01 to about 1.0, preferably from about 0.02 to about 0.5, and most preferably from 0.03 to 0.1 based on the total mole percent of the combined monomer and comonomer.

The second embodiment of the present invention provides grafted polymers that are highly absorbent to water or aqueous solutions. Grafted polymers as used herein are polymers of one or more species of monomers connected to a main chain as side chains, exclusive of branch point on the main chain. Side chains of a grafted polymer are distinguished from the main polymer chain by the monomer constitution of the side chain, i.e., the side chains comprise units derived from at least one species of monomer different from those that supply the units of the main polymer chain. The main polymer chain as utilized in the present invention are homopolymeric and copolymeric polymers such as polysaccharides, polypropylenes, polyethylenes and other polyolefins. Examples of suitable polysaccharides include, but are not limited to, starches, and derivatives of starches. The side chains are formed from at least one olefinic comonomer and an ampholytic monomer.

The term "graft copolymerization" is used herein, unless otherwise indicated, to mean a copolymer which results from the formation of an active site or sites at one or more points on the main chain of a polymer molecule other than its end and exposure to at least one other monomer. The graft polymers of the present invention are prepared by graft copolymerization of an effective amount of at least one olefinic comonomer onto a first polymer (main polymer chain) and thereafter graft copolymerizing therewith an ampholytic monomer disclosed hereinabove. The graft copolymerization can also be carried out by copolymerization of an ampholytic monomer (in an effective amount) onto a first polymer (main polymer chain) followed by graft copolymerization of the resulting polymer with an olefinic comonomer. The scope of the ampholytic monomers, comonomers, crosslinking agents, and quantity thereof are the same as those disclosed in the first embodiment of the present invention.

The graft copolymer of the second embodiment of the present invention can also be hydrolyzed, partially hydrolyzed, saponified, or neutralized as disclosed hereinabove.

Because the process of graft copolymerization is well known to one skilled in the art. Details description of the process is omitted herein for the interest of brevity. Such process can also be found in U.S. Pat. No. 5,281,673, disclosure of which is incorporated herein by reference.

According to the third embodiment of the present invention, a process for absorbing a fluid such as water or aqueous solutions comprises contacting a composition with the water or aqueous solution wherein the composition is selected from the group consisting of polymers, graft copolymers, and combinations of two or more thereof; wherein the polymer comprises repeat units derived from: (a) a vinylic tertiary amine or an ampholytic ion pair which comprises a cation moiety and an anion moiety wherein the cation moiety is a polymerizable vinylic nitrogen-containing monomer and the anion moiety is an acid having an ethylenic moiety wherein the acid is selected from the group consisting of phosphonic acids, phosphinic acids, sulfuric acids, sulfurous acids, sulfinic acids, sulfonic acids, carboxylic acids, phosphoric acids, metal salts of the acids, and combinations thereof; (b) at least one olefinic comonomer; and optionally, (c) at least one crosslinking agent which as at least two polymerizable olefinic functionalities wherein the olefinic functionalities are suitable for crosslinking. The graft copolymer is the same as that disclosed in the second embodiment of the invention. The scope and quantity of each ampholytic monomer, olefinic comonomer, and crosslinking agent are the same as those disclosed in the first embodiment of the invention. The graft copolymerization is also the same as that disclosed in the second embodiment of the invention.

Typical aqueous solutions include, but are not limited to, tap water, salt water, brine, blood, waste water, and urine. For the purpose of this invention, tap water is defined to have an electrolyte concentration of less than 500 ppm of dissolved electrolytes, urine is defined to have an electrolyte concentration of from greater than 500 ppm to at most 10,000 ppm of dissolved electrolytes, salt water is defined to have an electrolyte concentration from greater than 10,000 ppm to at most 34,000 ppm and brine is defined to have an electrolyte concentration of from greater than 34,000 ppm to the saturation point of the solution.

The scope of the absorbent polymer is the same as that described above for the first embodiment of the invention.

The following examples are provided to illustrate the advantages of the present invention and are not intended to unduly limit the present invention.

EXAMPLE I

This example is to illustrate the preparation and characterization of an ampholytic monomer, 1-vinyl-3-(3-sulfopropyl)imidazolium hydroxide inner salt (VSPIH). About 30.77 g (0.327 mol) of freshly distilled 1-vinyl imidazole was added to a 500 ml solution of 40.0 g (0.327 mol) 1,3-propane sultone in dry ethyl acetate. After reaction had undergone at room temperature under reflux condenser and constant stirring for 8 days, a finely divided white precipitate was obtained. Upon filtering followed by washing thoroughly with ethyl acetate and vacuum drying, a crude product was obtained in 76% yield. A portion of the crude product was recrystallized from absolute ethanol. Melting point (186° C.) and elemental compositions were found essentially the same for both crude and recrystallized products (Analysis calculated for $C_8H_{12}N_2SO_3$; C, 44.3%; H, 5.60%; N, 12.95%; S, 14.83%. Found: C, 44.40%; H, 5.67%; N, 12.83%; S, 14.70%). The monomer and its precursors were further analyzed by HPLC using UV detector set at 225 nm wavelength and the results showed 99.9% purity of the monomer. Thus, it was decided to use the crude product without further purification.

EXAMPLE II

This example shows the preparation of ampholytic ion pairmonomers.

An aqueous solution of an ethylenic acid was made in a predetermined amount of deionized water at 0°–10° C. to yield a 30–40 weight % aqueous solution. The acid solution was then neutralized by adding dropwise 75–100 weight % of a cation which is a vinylic amine-containing monomer at 0°–10° C. temperature over the period of 1–2 hours. The neutralization reaction was monitored by a pH meter. Final adjustment of pH to 7 was made at room temperature (about 25° C.). The resulting ampholytic ion pair monomer solution was then purified by contacting the ion pair monomer solution with small amount of activated charcoal two or more times. The actual concentration of the ampholytic ion pair monomer in the aqueous solution was determined by evaporatively drying a known amount of the solution and weighing the residue.

EXAMPLE III

This comparative example shows the absorbency of known crosslinked polymers.

The crosslinked polymers were prepared by mixing the monomers in the proportions given in Table I in an aqueous solution of deionized water. The monomers were present in 30–40 weight % relative to the amount of deionized water. The free radical polymerization was initiated with commercially available 2,2'-azobis(N,N'-dimethylisobutyramidine) dihydrochloride. The reaction mixture was then degassed by bubbling nitrogen gas through the mixture for 15 minutes. The amount of the azo free-radical initiator employed was 0.1 mole percent, based on the total moles of the monomers. The reaction temperature was maintained between 20°–35° C. for 24 hours. The reactions produced transparent or cloudy hard gels of the crosslinked polymers. A large volume (1,000 ml for 6 gram gel) of deionized water was added to the polymer product and the polymers were allowed to swell for about 24 hours. The swelled polymers were dried in a forced air convection oven at 74° C. The dried polymers were then mechanically blended into a powder.

Some of the crosslinked polymers were hydrolyzed or neutralized with a strong base such as aqueous sodium hydroxide or aqueous potassium hydroxide. The degree of hydrolysis or neutralization was controlled by stoichiometrically limiting the amount of base relative to the amount of amide, nitrile, or carboxylic acid functionalities. For these examples, a stoichiometric excess of the amount of base was used. A suspension of 1 gram of the polymer in about 20 ml of 0.5N aqueous sodium hydroxide was heated to 95° C. until a light golden-yellow color was obtained. The mixture was then transferred to a dialysis bag with a molecular weight cut-off of 12,000–14,000 and dialyzed exhaustively against distilled water until the viscous polymer gel had reached pH 7. This viscous polymer gel was then poured into a plastic dish and dried in a forced air convection oven at 74° C. The dried polymers were then mechanically blended to a powder.

The crosslinked polymers were then tested for deionized water absorption and synthetic urine absorption. About 1 liter of deionized water or synthetic urine was added to 0.1 to 0.5 gram of the dried polymer and allowed to stand for 24 hours. The polymer was then separated from the excess unabsorbed liquid by screening through a 100 mesh per inch stainless steel sieve. The absorbency was determined by weighing the isolated polymer containing the absorbed liquid and subtracting the weight of the dry polymer.

The absorbency was measured in units of grams of liquid per grams of polymer. The synthetic urine was prepared by dissolving 0.64 gram $CaCl_2$, 1.14 gram $MgSO_4 \cdot 7HO$, 8.20 gram NaCl, and 20.0 gram urea into 1000 gram deionized water. Several of the polymers were tested two or three times, and the experimental error was within plus or minus 2–5 percent. This small experimental error was largely caused by gel blocking and minor diffusion problems that prevented the aqueous liquid from coming in contact with all the polymer. The results are shown in Table I.

TABLE I

Control Data for Known Crosslinked Polymers

| RUN # | Mole Percent | | | | | Mole Ratio* | | g/g** | |
|---|---|---|---|---|---|---|---|---|---|
| | AMPS ® | AM | AN | AA | X-AA | LINK | XOH | DIW | SU |
| 1 | — | 100 | — | — | — | 0.05 | NO | 17 | 15 |
| 2 | — | 100 | — | — | — | 0.05 | YES | 1024 | 25 |
| 3 | — | 100 | — | — | — | 0.05 | YES | 364 | 40 |
| 4 | — | 100 | — | — | — | 0.20 | NO | 13 | 12.5 |
| 5 | — | 100 | — | — | — | 0.20 | YES | 295 | 16 |
| 6 | — | — | 100 | — | — | 0.5 | YES | 608 | 46 |
| 7 | — | — | 100 | — | — | 0.10 | NO | 0 | 0 |
| 8 | — | — | 100 | — | — | 0.10 | YES | 414 | 42 |
| 9 | — | — | 100 | — | — | 0.20 | YES | 352 | 25 |
| 10 | — | — | — | 100 | — | 0.20 | NO | 21 | 11 |
| 11 | — | — | — | 100 | — | 0.20 | Neu+ | 423 | 10 |
| 12 | — | — | — | — | 100(K) | 0.05 | NO | 669 | 57 |

TABLE I-continued

Control Data for Known Crosslinked Polymers

| RUN # | Mole Percent | | | | | Mole Ratio* | | g/g** | |
|---|---|---|---|---|---|---|---|---|---|
| | AMPS ® | AM | AN | AA | X-AA | LINK | XOH | DIW | SU |
| 13 | — | — | — | — | 100(Na) | 0.05 | NO | 505 | 41 |
| 14 | — | 13 | — | — | 87 | 0.05 | NO | — | 65 |
| 15 | 3 | 13 | — | — | 84 | 0.05 | NO | 350 | 38 |
| 16 | 3 | 20 | — | — | 77 | 0.05 | NO | 417 | 47 |
| 17 | 6 | 13 | — | — | 81 | 0.05 | NO | 738 | 56 |
| 18 | 6 | 26 | — | — | 68 | 0.05 | NO | 533 | 47 |
| 19 | 6 | — | — | — | 94 | 0.05 | NO | 488 | 55 |
| 20 | 10 | 13 | — | — | 77 | 0.05 | NO | 570 | 59 |
| 21 | 20 | 13 | — | — | 67 | 0.05 | NO | 624 | 62 |
| 22 | 100 | — | — | — | — | 0.05 | NO | -Soluble- | |

AMPS ® = 2-acrylamido-2-methylpropane sulfonate (Note: AMPS ® is a trademark of Lubrizol for 2-acrylamido-2-methylpropane sulfonic acid).
AM = Acrylamide
AN = Acrylonitrile
AA = Acrylic Acid
X-AA = Sodium Acrylate or Potassium Acrylate
LINK = Methylene-bis-acrylamide Crosslinking Agent
XOH = Basic Hydrolysis and/or Neutralization with aqueous NaOH or KOH
DIW = Deionized Water
SU = Synthetic Urine
*mole ratio = mole of the crosslinking agent per 100 mole of the ampholytic monomer and the comonomer
**g/g = absorbency units of gram aqueous liquid per gram dried polymer
+Neu = Neutralized The data in Table I demonstrates that although known crosslinked polymers are highly absorbent to deionized water, they are dramatically less absorbent to aqueous electrolyte solutions such as salt water and urine.

Known polymer compositions include crosslinked polyacrylamide, partially saponified crosslinked polyacrylamide, crosslinked polyacrylonitrile, partially saponified crosslinked acrylonitrile, crosslinked polyacrylic acid, neutralized crosslinked polyacrylic acid, crosslinked polyacrylate, and polymers thereof with sodium 2-acrylamido-2-methylpropane sulfonate. The best of these known polymers absorb up to 65 g of synthetic urine per g of polymer, and most of the known polymers absorb much less than 50 g of synthetic urine per of g of polymer.

EXAMPLE IV

The data in Table II demonstrates that although commercially available water absorbing materials are highly absorbent to water, they are also dramatically less absorbent to aqueous electrolyte solutions such as salt water and urine. The commercially available water absorbing materials tested include poly(co-acrylamide-co-acrylic acid) grafted onto starch, a commercial acrylamide polymer sold under the trademark "Water Grabber"® ("Water Grabber" is a trademark of F. P. Products, Inc.), "LUVS"® diaper absorbent ("LUVS" is a trademark of Procter & Gamble Co.), "Pampers"® diaper absorbent ("Pampers" is a trademark of Procter & Gamble Co.), and Favor 960"® (Stockhausen, Inc.). The best of these known materials absorb up to about 56 grams of urine per gram of absorbing material, and most of the known polymers absorb much less than 40 grams of urine per gram of absorbing material.

The commercially available materials were tested for absorbency to aqueous liquids according to the method employed in Example III.

TABLE II[a]

Control Data for Commercial Materials

| Run # | Commercial Material | DIW g/g | SU g/g |
|---|---|---|---|
| 101 | Commercial Starch-g[b]-poly(AM-AA) | 345 | 37 |
| 102 | Water Grabber ® (AM Copolymer) | 440 | 34 |
| 103 | Luvs ® Diaper Absorbent | 191 | 16 |
| 104 | Pampers ® Diaper Absorbent | 171 | 12 |
| 105 | Favor 960 ® | 369 | 56 |

[a]See Table I for footnotes
[b]g = graft

EXAMPLE V

The homopolymers of the ampholytic ion-pair monomers prepared from 2-methacryloyloxyethyldimethylammonium acrylate (MEDMA-AA), 2-methacryloyloxyethyldimethylammonium methacrylate (MEDMA-MAA), 2-methacryloyloxyethyldimethylammonium 2-acrylamido 2-methylpropanesulfonate (MEDMA-AMPS) or 2-methacryloyloxyethyldimethylammonium 2-methacryloyloxyethane sulfonate (MEDMA-MES) and 0.05 mole % methylene-bis-acrylamide crosslinking agent were tested for their absorbency to deionized water and synthetic urine. The absorbency of homopolymers was very poor as shown in Table III. The absorbency to deionized water was only 8–15 grams of water per gram of polymer and only 10–24 grams of SU per gram of the homopolymers.

TABLE III[a]

Control Data for Ion-Pair Homopolymer

| Mole Percent | | | | Mole Ratio | g/g | |
|---|---|---|---|---|---|---|
| MEDMA-AA | MEDMA-MAA | MEDMA-AMPS | MEDMA-MES | Link | DIW | SU |
| 100 | — | — | — | 0.05 | 15 | 20 |
| — | 100 | — | — | 0.05 | 15 | 24 |
| — | — | 100 | — | 0.05 | 8 | 10 |
| — | — | — | 100 | 0.05 | 9 | 20 |

[a]See Table I for footnotes

EXAMPLE VI

This example illustrates that the inventive polymers prepared from an ampholytic monomer having a polymerizable amine-containing monomer and a vinylic acid and a comonomer having an ethylenic linkage exhibit much higher absorbency to aqueous solutions.

The polymers were prepared according to the method described in Example III, except that the inventive polymers were prepared by mixing the monomers in the proportions given in Table IV–VII. The inventive polymers were tested for absorbency to deionized water and synthetic urine according to the method described in Example III and the results are shown in Tables IV–VII.

TABLE IV[a]

Experimental Data for Inventive MEDMA/AA[b] Polymers

| Run No. | Mole Percent | | | Mole Ratio | | g/g | |
|---|---|---|---|---|---|---|---|
| | MEDMA/AA | AM | X-AA | Link | XOH | DIW | SU |
| 201 | 3 | — | 97 | 0.05 | No | 708 | 84 |
| 202 | 6 | — | 94 | 0.05 | No | 560 | 76 |
| 203 | 10 | — | 90 | 0.05 | No | 584 | 94 |
| 204 | 50 | — | 50 | 0.05 | No | 353 | 38 |
| 205 | 3 | 13 | 84 | 0.05 | No | 746 | 65 |
| 206 | 3 | 13 | 84 | 0.05 | No | 596 | 72 |
| 207 | 3 | 13 | 84 | 0.05 | No | 600 | 67 |
| 208 | 6 | 13 | 81 | 0.05 | No | 782 | 79 |
| 209 | 6 | 13 | 81 | 0.05 | No | 613 | 82 |
| 210 | 3 | 20 | 77 | 0.05 | No | 893 | 71 |
| 211 | 3 | 20 | 77 | 0.05 | No | 770 | 82 |

[a]See Table I for footnotes
[b]MEDMA/AA = 2-methacryloyloxyethyldimethylammonium cation/acrylate anion

TABLE V[a]

Experimental Data for Inventive MEDMA/MAA[b] Polymers

| Run No. | Mole Percent | | | Mole Ratio | | g/g | |
|---|---|---|---|---|---|---|---|
| | MEDMA/MAA | AM | X-AA | Link | XOH | DIW | SU |
| 312 | 3 | — | 97 | 0.05 | No | 608 | 70 |
| 313 | 6 | — | 94 | 0.05 | No | 610 | 69 |
| 314 | 15 | 0 | 85 | 0.05 | No | 547 | 81 |
| 315 | 3 | 13 | 84 | 0.05 | No | 621 | 58 |
| 316 | 6 | 13 | 81 | 0.05 | No | 570 | 67 |
| 317 | 10 | 13 | 77 | 0.05 | No | 596 | 67 |
| 317 | 10 | 13 | 77 | 0.05 | No | 596 | 72 |
| 318 | 3 | 20 | 77 | 0.05 | No | 590 | 79 |

[a]See Table I for footnotes
[b]MEDMA/MAA = 2-methacryloyloxyethyldimethylammonium cation/methacrylate anion

TABLE VI[a]

Experimental Data for Inventive MEDMA/AMPS[b] Polymers

| Mole Percent | | | | | Mole Ratio | | g/g | |
|---|---|---|---|---|---|---|---|---|
| MEDMA/AMPS | AM | AN | AMPS | X-AA | LINK | XOH | DIW | SU |
| 5 | 95 | — | — | — | 0.05 | YES | 666 | 100 |
| 10 | 90 | — | — | — | 0.05 | YES | 740 | 112 |
| 15 | 85 | — | — | — | 0.05 | YES | 645 | 76 |
| 20 | 80 | — | — | — | 0.05 | YES | 486 | 80 |
| 5 | — | 95 | — | — | 0.10 | YES | 256 | 51 |
| 10 | — | 90 | — | — | 0.10 | YES | 500 | 97 |
| 15 | — | 85 | — | — | 0.10 | YES | 594 | 108 |
| 20 | — | 80 | — | — | 0.10 | YES | 600 | 92 |
| 6 | — | — | 94 | — | 0.05 | NO | 215 | 60 |
| 10 | — | — | 90 | 00 | 0.05 | NO | 256 | 69 |

TABLE VI[a]-continued

Experimental Data for Inventive MEDMA/AMPS[b] Polymers

| MEDMA/AMPS | Mole Percent | | | | Mole Ratio | | g/g | |
|---|---|---|---|---|---|---|---|---|
| | AM | AN | AMPS | X-AA | LINK | XOH | DIW | SU |
| 15 | — | — | 85 | — | 0.05 | NO | 260 | 82 |
| 20 | — | — | 80 | — | 0.05 | NO | 479 | 81 |
| 3 | — | — | — | 97 | 0.05 | NO | 609 | 74 |
| 6 | — | — | — | 94 | 0.05 | NO | 467 | 70 |
| 10 | — | — | — | 90 | 0.05 | NO | 553 | 65 |
| 3 | 13 | — | 84 | — | 0.05 | NO | 527 | 84 |
| 3 | 13 | — | 84 | — | 0.05 | NO | 600 | 83 |
| 6 | 10 | — | 84 | — | 0.05 | NO | 310 | 64 |
| 3 | 20 | — | 77 | — | 0.05 | NO | 600 | 80 |
| 1.5 | 26 | — | — | 72.5 | 0.05 | NO | 922 | 75 |
| 3 | 1.3 | — | — | 84 | 0.05 | NO | 755 | 80 |
| 3 | 13 | — | — | 84 | 0.05 | NO | 728 | 80 |
| 3 | 20 | — | — | 77 | 0.05 | NO | 836 | 75 |
| 3 | 20 | — | — | 77 | 0.05 | NO | 800 | 77 |
| 3 | 26 | — | — | 71 | 0.05 | NO | — | 80 |
| 3 | 26 | — | — | 71 | 0.05 | NO | — | 80 |
| 6 | 26 | — | — | 68 | 0.05 | NO | 775 | 70 |
| 6 | 26 | — | — | 68 | 0.05 | NO | 752 | 70 |
| 10 | 13 | — | — | 77 | 0.05 | NO | 709 | 60 |
| 10 | 20 | — | — | 70 | 0.05 | NO | 543 | 75 |
| 10 | 20 | — | — | 70 | 0.10 | NO | 500 | 65 |
| 10 | 26 | — | — | 64 | 0.05 | NO | 658 | 60 |

[a]See Table I for footnotes
[b]MEDMA/AMPS = 2-methacryloyloxyethyldimethylammonium cation/2-acrylamido-2-methylpropane sulfonate anion

TABLE VII[a]

Experimental Data for Inventive MEDMA/MES[b] Polymers

| MEDMA/MES | Mole Percent | | | | Mole Ratio | | g/g | |
|---|---|---|---|---|---|---|---|---|
| | AA | AN | AA | X-AA | LINK | XOH | DIW | SU |
| 10 | 90 | — | — | — | 0.05 | YES | 694 | 106 |
| 14 | 86 | — | — | — | 0.05 | YES | 1200 | 105 |
| 15 | 85 | — | — | — | 0.04 | YES | 1300 | 121 |
| 15 | 85 | — | — | — | 0.05 | YES | 1500 | 120 |
| 20 | 80 | — | — | — | 0.04 | YES | 1200 | 85 |
| 23 | 77 | — | — | — | 0.04 | YES | 1008 | 90 |
| 25 | 75 | — | — | — | 0.04 | YES | 1000 | 90 |
| 50 | 50 | — | — | — | 0.05 | YES | 622 | 100 |
| 6 | — | 94 | — | — | 0.05 | YES | 480 | 70 |
| 10 | — | 90 | — | — | 0.05 | YES | 443 | 77 |
| 15 | — | 85 | — | — | 0.05 | YES | 678 | 110 |
| 20 | — | 80 | — | — | 0.05 | YES | 378 | 106 |
| 25 | — | 75 | — | — | 0.05 | YES | 200 | 70 |
| 50 | — | 50 | — | — | 0.05 | YES | 274 | 45 |
| 3 | — | — | — | 97 | 0.05 | NO | 873 | 70 |
| 3 | 13 | — | — | 84 | 0.05 | NO | 616 | 90 |
| 3 | 27 | — | — | 70 | 0.05 | NO | 462 | 85 |
| 3 | 35 | — | — | 62 | 0.05 | NO | 739 | 80 |
| 3 | 47 | — | — | 50 | 0.05 | NO | 694 | 72 |
| 3 | 57 | 00 | 00 | 40 | 0.05 | No | 609 | 67 |
| 6 | 13 | — | — | 81 | 0.05 | NO | 521 | 83 |
| 10 | 13 | — | — | 77 | 0.05 | NO | 358 | 84 |
| 15 | 13 | — | — | 72 | 0.05 | NO | 528 | 86 |
| 25 | 13 | — | — | 62 | 0.05 | NO | 473 | 74 |
| 10 | 40 | — | — | 50 | 0.05 | NO | 739 | 80 |

[a]See Table I for footnotes
[b]MEDMA/MES = 2-methacryloyloxyethyldimethylammonium cation/2-methacryloyloxyethane sulfonate anion The data in Table IV, V, VI and VII demonstrate that these polymers exhibit significantly improved absorbency to aqueous electrolyte solutions such as urine over the absorbency of the known polymers listed in Table I, the commercially available materials listed in Table II, and the crosslinked ampholytic ion-pair homopolymers listed in Table III.

The absorbency of these polymers to urine is highly unexpected in view of the fact that the homopolymers of ampholytic ion-pair monomers with 0.05 mole percent crosslinking agent only absorb 10–24 gram of synthetic urine per gram of the polymer (Table III). These results demonstrate that the monomers when combined into the polymers of the present invention act synergistically to increase the absorbency of the polymers to aqueous liquids such as salt water and synthetic urine.

Taking an absorbency of about 56 grams of synthetic urine per gram of polymer as about the best of the known polymers, the preferred polymers of the present invention exceed this absorbency to synthetic urine by 20 to 116 percent (67 to 121 grams of synthetic urine absorbed per gram of inventive polymers, Tables IV–VII, compared to 56 grams urine per gram for the best known materials, Tables I and II) without sacrificing absorbency to deionized water. These improved absorbencies translate into large savings in the quantity of polymer required and large savings to the comonomer.

EXAMPLE VII

This example illustrates the preparation of graft copolymers and the absorbency of aqueous solutions by the graft copolymers.

The graft copolymers were prepared by a two-step procedure. About 10 grams of reagent grade soluble starch was added to 70 ml of deionized water. The slurry was purged with a slow stream of nitrogen, heated to 95° C. over a period of 1 hour, and finally allowed to cool under nitrogen to room temperature (about 22° C.). A solution of 0.25 gram ceric ammonium nitrate in 2 ml 1N nitric acid was added to the cooled stirring soluble starch slurry. After about 1 minute, acrylonitrile (0.1884–0.2547 moles) was added to the soluble starch slurry mixture. The mixture was stirred under nitrogen for 2–3 hours.

The mixture was then heated to 60° C., at which point a solution of 0.18 gram ceric ammonium nitrate in 1.5 ml 1N nitric acid was added to the mixture. After about 1 minute, an aqueous solution (30–40 weight %) of ampholytic ion-pair monomer was added to the warmed mixture. The relative mole percents of acrylonitrile and ampholytic ion-pair monomer are given in Table V. This new mixture was stirred under nitrogen at 60° C. for another 4–5 hours.

The pH of the mixture was then adjusted to between 4 and 5. The solid crude starch grafted acrylonitrile/ion-pair copolymer was obtained by evaporating the aqueous solvent in a forced air oven maintained at 74° C. The crude grafted polymer was washed by boiling in dimethylformamide to remove non-grafted acrylonitrile homo- and acrylonitrile/ion-pair copolymers. It was then thoroughly washed with deionized water to remove any water soluble polymer. The purified grafted material was finally washed with ethanol and dried in a vacuum oven at 60° C. for 24 hours. The dried polymers were then mechanically blended to a powder. The yield of starch grafted polymer was typically between 50 and 90 weight % based on the total weight of the starch, acrylonitrile, and ion-pair monomers.

A suspension of 1 gram of starch grafted copolymer in about 20 ml of 0.5M aqueous NaOH was heated to 95° C. until light golden-yellow color was obtained. The paste-like mixture was then transferred to a dialysis bag with a molecular weight cut-off of 12,000–14,000 and dialyzed exhaustively against distilled water until the fiscous polymer gel had reached pH 7. This viscous polymer gel was then poured into a plastic dish and dried in a forced air oven at 74° C. The dried polymers were mechanically blended to a powder.

An accurately weighed (0.005 to 0.1 gram) dry polymer sample was allowed to stand for 24 hours in 100 ml solvent at room temperature. The polymer was then separated from the excess unabsorbed liquid by screening through a 100 mesh/sq. inch stainless steel sieve. The absorbency was determined by weighing the isolated polymer gel containing the absorbed solvent and subtracting the dry polymer weight from it. The absorbency was measured in units of grams of liquid per gram of polymer. The synthetic urine was prepared by dissolving 0.64 g $CaCl_2$, 1.14 g $MgSO_4 \cdot 7H_2O$, 8.20 g NaCl, and 20.0 g urea into 1000 g deionized water. The results are shown in Table VIII.

TABLE VIII[a]

| Run | Ion-Pair mole % | AN Yield | XOH | Absorbency (g/g) DIW | SU |
|---|---|---|---|---|---|
| 401[b] | 23 | 77 | 44 | Yes | 1119 | 74 |
| 402[c] | 7 | 93 | 83 | Yes | 565 | 73 |
| 403[c] | 10 | 90 | 60 | Yes | 603 | 70 |
| 404[c] | 20 | 80 | 84 | Yes | 349 | 64 |
| 405[d] | 6.2 | 93.8 | 73 | Yes | 800 | 70 |
| 406[d] | 11.7 | 89.3 | 85 | Yes | 585 | 78 |
| 407[e] | 19 | 81 | 88 | Yes | 478 | 67 |
| 408 | 10 | 90 | 80 | Yes | 689 | 69 |
| 409 | 24 | 76 | 30 | Yes | 325 | 67 |
| 410 | 10 | 90 | 70 | Yes | 637 | 73 |
| 411 | 20 | 80 | 55 | Yes | 900 | 86 |
| 412 | 6.8 | 93.2 | 58 | Yes | 800 | 70 |
| 413 | 12.7 | 87.3 | 57 | Yes | 616 | 63 |
| 414 | 7 | 93 | 67 | Yes | 556 | 80 |
| 415 | 13 | 87 | 53 | Yes | 550 | 78 |

[a]See Table I for footnotes
[b]Run 401 used MPTMA/AMPS(3-methacrylamidopropyltrimethylammonium/ampholytic 2-acrylamido-2-methylpropanesulfonate) as ion pair
[c]Runs 402–404 used MEDMA/AMPS(2-methacryloxyethyldimethylammonium/2-acrylamido-2-methylpropane sulfonate) as ampholytic ion pair
[d]Runs 405–406 used MEDEA/AMPS(2-methacryloyloxyethyldiethylammonium/2-acrylamido-2-methylpropane sulfonate) as ampholytic ion pair
[e]Run 407 used MPDMA/AMPS(3-methacrylamidopropyldimethylammonium/2-acrylamido-2-methylpropane sulfonate) as ampholytic ion pair
[f]Runs 408–409 used METMA/MES(2-methacryloyloxyethyltrimethylammonium/2-methacryloyloxyethane sulfonate) as ampholytic ion pair
[g]Runs 410–411 used MEDMA/MES(2-methacryloyloxyethyldimethylammonium/2-methacryloyloxyethane sulfonate) as ampholytic ion pair
[h]Runs 412–412 used MEDEA/MES(2-methacryloyloxyethyldiethylammonium/2-methacryloyloxyethane sulfonate) as ampholytic ion pair
[i]Runs 414–415 used MPDMA/MES(3-methacrylamidopropyldimethylammonium/2-methacryloyloxyethane sulfonate) as ampholytic ion pair Results shown in Table VIII show that all grafted copolymers exhibited high absorbency toward both deionized water and synthetic urine.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the claims.

That which is claimed is:

1. A composition comprising a water-insoluble polymer which comprises repeat units derived from (a) at least one ampholytic monomer selected from the group consisting of ampholytic inner salts, ampholytic ion pairs, vinylic tertiary amines, and combinations of two or more thereof; and (b) at least one olefinic comonomer;

wherein said ampholytic inner salt has the formula of

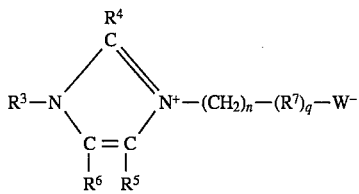

wherein one and only one of $R^3$, $R^4$, $R^5$, and $R^6$ must be a vinyl group, the rest can be the same or different and can be hydrogen, alkyl radical, aryl radical, aralkyl radical, or alkaryl radical; $R^7$ is a phenyl group; n is $\geq 1$ and $\leq 6$; q is 0 or 1;

wherein W is an acid moiety selected from the group consisting of phosphonic acids, phosphinic acids, sulfuric acids, sulfurous acids, sulfinic acids, sulfonic acids, carboxylic acids, phosphoric acids, alkali metal salts of the acids, and combinations of two or more thereof;

wherein said ampholytic ion pair comprises a cation moiety and an anion moiety wherein said cation moiety is derived from a polymerizable vinylic nitrogen-containing monomer and has the formula of $R^1$—$C(R^1)$=$C(R^2)$—$C(O)$—G—Y—Z wherein $R^1$ and $R^2$ are each independently selected from the group consisting of hydrogen, alkyl radicals, aryl radicals, aralkyl radicals, alkaryl radicals, and combinations of two or more thereof wherein each radical contains 1 to about 12 carbon atoms; G is O or NH; Y is an alkylene radical which has 1 to about 10 carbon atoms; Z has a formula selected from the group consisting of $N^+(R^2)_2$, $N^+(R^2)_3X^-$, and combinations thereof; and X is an inorganic anion selected from the group consisting of halides, sulfate, phosphate, nitrate, sulfonates, phosphonates, phosphinates, sulfinates, and combinations of two or more thereof; and the anion moiety is a vinylic acid having an acid moiety selected from the group consisting of phosphonic acids, phosphinic acids, sulfuric acids, sulfurous acids, sulfinic acids, sulfonic acids, alkali metal salts of the acids, and combinations of two or more thereof; and wherein said olefinic comonomer has a functionality selected from the group consisting of amine, amide, nitrile, carboxylic acid, sulfonic acid, phosphonic acid, sulfinic acid, phosphinic acid, and combinations of two or more thereof.

2. A composition according to claim 1 wherein said ampholytic inner salt is selected from the group consisting of 1-vinyl-3-(3-sulfopropyl)imidazolium hydroxide inner salt, 1-vinyl-3-(4-sulfobutyl)imidazolium hydroxide inner salt, 1-vinyl-2-methyl-3-(3-sulfopropyl)imidazolium hydroxide inner salt, 1-vinyl-2-methyl-3-(4-sulfobutyl)imidazolium hydroxide inner salt, 1-vinyl-3-(2 -sulfobenzyl)imidazolium hydroxide inner salt, 2-vinyl-3-(3-sulfopropyl)imidazolium hydroxide inner salt, 2-vinyl-3-(4-sulfobutyl)imidazolium hydroxide inner salt, 4(5)-vinyl-1-(3-sulfopropylsulfobutyl)imidazolium hydroxide inner salt, 4(5)-vinyl-1-(4-sulfobutyl)imidazolium hydroxide inner salt, 1-methyl-2-vinyl-3-(3-sulfopropyl)imidazolium hydroxide inner salt, 1-vinyl-3-(4-sulfobutyl)imidazolium hydroxide inner salt, 2-vinyl-1-(3-sulfopropyl)imidazolium hydroxide inner salt, 2-methyl-5-vinyl-1-(3-sulfopropyl)pyridinium hydroxide inner salt, 4-vinyl-1-(3-sulfopropyl)pyridinium hydroxide inner salt, dimethyl-(2-methacryloxyethyl)(3-sulfopropyl)pyridinium hydroxide inner salt, dimethyl-(2-methacryloxyethyl)(3-sulfopropyl)ammonium hydroxide inner salt, diethyl-(2-methacryloyloxyethoxy-2-ethyl)(3-sulfopropyl)ammonium hydroxide inner salt, 4-vinyl-4-(sulfobutyl)pyridinium hydroxide inner salt, 2-vinyl-2-(4-sulfobutyl)pyridinium hydroxide inner salt, N-(3-sulfopropyl)-N-methacrylamidopropyl-N,N-dimethylammonium betaine, N-(3 -carboxypropyl)-N-methacrylamidopropyl-N,N-dimethylammonium betaine, 4-vinylpiperidinium ethanecarboxy betaine, 4-vinylpiperidinium methanecarboxy betaine, and combinations of two or more thereof.

3. A composition according to claim 1 wherein said ampholytic inner salt is 1-vinyl-3-(3-sulfopropyl)imidazolium hydroxide.

4. A composition according to claim 1 wherein said polymerizable nitrogen-containing monomer is selected from the group consisting of 2-methacryloyloxyethyltrimethylammonium halides, 2-acryloyloxyethyltrimethylammonium halides, 2-methacryloyloxyethyldiethylamine, 2-acryloyloxyethyldiethylamine, 3-methacrylamidopropyltrimethylammonium halides, 3-acrylamidopropyltrimethylammonium halides, 3-methacrylamidopropyldimethylamine, 3-acrylamidopropyldimethylamine, 2-methacryloyloxyethyldimethylamine, 2-acryloyloxyethyldimethylamine, 2-acrylamido-2-methylpropanediamethylamine, 2-methacrylamido-2-methylpropanedimethylamine, 2-methacrylamido-2-methylbutanedimethylamine, N-vinylimidazole, 1-methyl-2-vinylimidazole, 2-vinylimidazole, 4(5)-vinylimidazole, 2-vinylpyridine, 4-vinylpyridine, 2-dimethylaminoethyl methacrylate, 2-diethylaminoethyl methacrylate, 3-methacrylamidopropyldimethylammonium halides, 3-methacrylamidobutyldimethylammonium halides, diallyldimethylammonium, 2-vinylquinoline, and combinations of two or more thereof.

5. A composition according to claim 1 wherein said olefinic comonomer is selected from the group consisting of

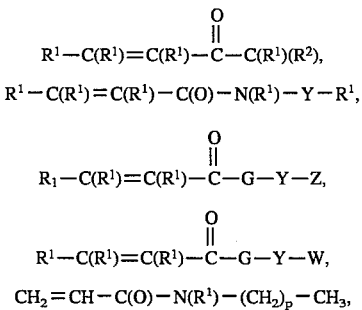

$CH_2=CH-C(O)-N(R^1)-(CH_2)_p-CH_3$, and combinations of two or more thereof wherein p is a number of 1 to about 10, W is an acid moiety selected from the group consisting of phosphonic acids, phosphinic acids, sulfuric acids, sulfurous acids, sulfinic acids, sulfonic acids, carboxylic acids, phosphoric acids, alkali metal salts of the acids, and combinations of two or more thereof; $R^1$ and $R^2$ are each independently selected from the group consisting of hydrogen, alkyl radicals, aryl radicals, aralkyl radicals, alkaryl radicals, and combinations of two or more thereof wherein each radical contains 1 to about 12 carbon atoms; G is O or NH; Y is an alkylene radical which has 1 to about 10 carbon atoms; Z has a formula selected from the group consisting of N $(R^2)_2$, $N^+(R^2)_3X^-$, and combinations thereof; and X is an inorganic anion selected from the group consisting of halides, sulfate, phosphate, nitrate, sulfonates, phosphonates, phosphinates, sulfinates, and combinations thereof.

6. A composition according to claim 1 wherein about 1 to about 99% of said functionality in said water-insoluble polymer is hydrolyzed.

7. A composition comprising a water-insoluble polymer which comprises repeat units derived from an ampholytic monomer and an olefinic comonomer wherein said ampholytic monomer is selected from the group consisting of 1-vinyl-3-(3-sulfopropyl)-imidazolium hydroxide inner salt, 1-vinyl-3-(4-sulfobutyl)imidazolium hydroxide inner salt, 1-vinyl-2-methyl-3-(3-sulfopropyl)imidazolium hydroxide inner salt, 1-vinyl-2-methyl-3-(4-sulfobutyl)imidazolium hydroxide inner salt, 1-vinyl-3-(2-sulfobenzyl)imidazolium hydroxide inner salt, 2-vinyl-3-(3-sulfopropyl)imidazolium hydroxide inner salt, 2-vinyl-3-(4-sulfobutyl)imidazolium hydroxide inner salt, 4(5)-vinyl-1-(3-sulfopropyl-sulfobutyl)imidazolium hydroxide inner salt, 4(5)-vinyl-1-(4-sulfobutyl)imidazolium hydroxide inner salt, 1-methyl-2-vinyl-(3-sulfopropyl)imidazolium hydroxide inner salt, 1-vinyl-3-(4-sulfobutyl)imidazolium hydroxide inner salt, 2-vinyl-1-(3-sulfopropyl)imidazolium hydroxide inner salt, 2-methyl-5-vinyl-1-(3-sulfopropyl)pyridinium hydroxide inner salt, 4-vinyl-1-(3-sulfopropyl)pyridinium hydroxide inner salt, dimethyl-(2-methacryloxyethyl)(3-sulfopropyl)pyridinium hydroxide inner salt, dimethyl-(2-methacryloxyethyl)(3-sulfopropyl)ammonium hydroxide inner salt, diethyl-(2-methacryloyloxyethoxy-2-ethyl)(3-sulfopropyl)ammonium hydroxide inner salt, 4-vinyl-4-(sulfobutyl)pyridinium hydroxide inner salt, 2-vinyl-2-(4-sulfobutyl)pyridinium hydroxide inner salt, N-(3-sulfopropyl)-N-methacrylamidopropyl-N,N-dimethylammonium betaine, N-(3-carboxypropyl)-N-methacrylamidopropyl-N,N-dimethylammonium betaine, 4-vinylpiperidinium ethanecarboxy betaine, 4-vinylpiperidinium methanecarboxy betaine, 3-(2-acrylamido-2-methylpropyldimethylammonium propanesulfonate, 2-methacryloyloxyethyltrimethylammonium halides, 2-acryloyloxyethyltrimethylammonium halides, 2-methacryloyloxyethyldiethylamine, 2-acryloyloxyethyldiethylamine, 3-methacrylamidopropyltrimethylammonium halides, 3-acrylamidopropyltrimethylammonium halides, 3-methacrylamidopropyldimethylamine, 3-acrylamidopropyldimethylamine, 2-methacryloyloxyethyldimethylamine, 2-acryloyloxyethyldimethylamine, 2-acrylamido-2-methylpropanedimethylamine, 2-methacrylamido-2-methylpropanedimethylamine, 2-methacrylamido-2-methylbutanedimethylamine, N-vinylimidazole, 1-methyl-2-vinylimidazole, 2-vinylimidazole, 4(5)-vinylimidazole, 2-vinylpyridine, 4-vinylpyridine, 2-dimethylaminoethyl methacrylate, 2-diethylaminoethyl methacrylate, 3-methacrylamidopropyldimethylammonium halides, 3-methacrylamidobutyldimethylammonium halides, diallyldimethylammonium, diallyldimethylamine, 2-vinylquinoline, and combinations of two or more thereof; and said olefinic comonomer is selected from the group consisting of acryloylpiperizine, methacryloylpiperizine, methacryloylmorpholine, acrylamide, methacrylamide, acrylonitrile, acrylic acid, methacrylic acid, alkali metal salts of acrylic acid, alkali metal salts of methacrylic acid, 2-methacryloyloxyethyltrimethylamine, 2-acrylamido-2-methylpropane sulfonic acid, alkali metal salts of 2-acrylamido-2-methylpropane sulfonic acid, 2-methacryloyloxyethane sulfonic acid, alkali metal salts of 2-methacryloyloxyethane sulfonic acid, acryloylmorpholine, N-4-butylphenylacrylamide, 2-acrylamido-2-methylpropane dimethylammonium chloride, 2-methacryloyloxyethyldiethylamine, 3-methacrylamidopropyldimethylamine, styrene sulfonic acid, alkali metal salts of styrene sulfonic acid, N-vinyl-2-pyrrolidone, and combinations of two or more thereof.

* * * * *